(12) United States Patent
Uneme et al.

(10) Patent No.: US 6,338,287 B1
(45) Date of Patent: Jan. 15, 2002

(54) PUSH-PULL CONTROL CABLE

(75) Inventors: Masato Uneme, Nagoya; Seiji Yamada, Nishikamo-gun; Yasuhiro Yamada, Toyota; Koichi Nagata, Kaizuka, all of (JP)

(73) Assignees: Chuo Hatsujo Kabushiki Kaisha, Aichi-Ken; Kabushiki Kaisha Aporon, Osaka-Fu, both of (JP)

( * ) Notice: Subject to any disclaimer, the term of this patent is extended or adjusted under 35 U.S.C. 154(b) by 0 days.

(21) Appl. No.: 09/639,087

(22) Filed: Aug. 16, 2000

Related U.S. Application Data

(63) Continuation of application No. 09/235,761, filed on Jan. 25, 1999, now Pat. No. 6,209,415.

(30) Foreign Application Priority Data

Jan. 23, 1998 (JP) .............................................. 10-11845

(51) Int. Cl.[7] ................................................. F16C 1/10
(52) U.S. Cl. ................ 74/502.5; 74/500.5; 74/501.5 R; 428/36
(58) Field of Search ...................... 74/501.5 R–502.6; 428/36

(56) References Cited

U.S. PATENT DOCUMENTS

| | | | | |
|---|---|---|---|---|
| 4,112,708 A | * | 9/1978 | Fukuda ...................... | 74/502.5 |
| 4,300,408 A | * | 11/1981 | Yoshifuji ................... | 74/501 R |
| 4,362,069 A | * | 12/1982 | Giatras et al. ............. | 428/36 X |
| 4,951,523 A | * | 8/1990 | Shiota et al. ............... | 74/502.5 |
| 5,038,834 A | * | 8/1991 | Siegfried ..................... | 138/173 |
| 5,195,393 A | * | 3/1993 | Wolfington et al. ......... | 74/502.5 |
| 5,243,876 A | * | 9/1993 | Mang et al. ................ | 74/502.5 |
| 5,245,887 A | * | 9/1993 | Tanaka et al. .............. | 74/502.5 |
| 5,636,551 A | * | 6/1997 | Davidson et al. ........... | 74/502.5 |
| 5,802,929 A | * | 9/1998 | Furukawa et al. .......... | 74/502.5 |
| 6,151,983 A | * | 11/2000 | Misaki et al. ............... | 74/502.5 |

FOREIGN PATENT DOCUMENTS

| | | | | |
|---|---|---|---|---|
| CA | 514602 | * | 7/1955 | ................ 74/502.5 |
| JP | 6-200918 | * | 7/1955 | ................ 74/502.5 |
| JP | 62-292912 | * | 12/1987 | ................ 74/502.5 |
| JP | 4-327017 | * | 11/1992 | ................ 74/502.5 |
| JP | 6-300032 | * | 10/1994 | ................ 74/502.5 |
| JP | 7-26646 | * | 3/1995 | ................ 74/502.5 |

* cited by examiner

*Primary Examiner*—Vinh T. Luong
(74) *Attorney, Agent, or Firm*—Reed Smith Hazel & Thomas LLP

(57) ABSTRACT

A push-pull type control cable having a conduit tube and an inner cable comprised of a core wire and a plurality of strands wound around the core wire and inserted into the conduit tube, the control cable being filled with lubricant at a clearance between an inner periphery of the conduit tube and an outer periphery of the inner cable, wherein the plurality of strands each are comprised of three pieces of twisted element wires.

4 Claims, 10 Drawing Sheets

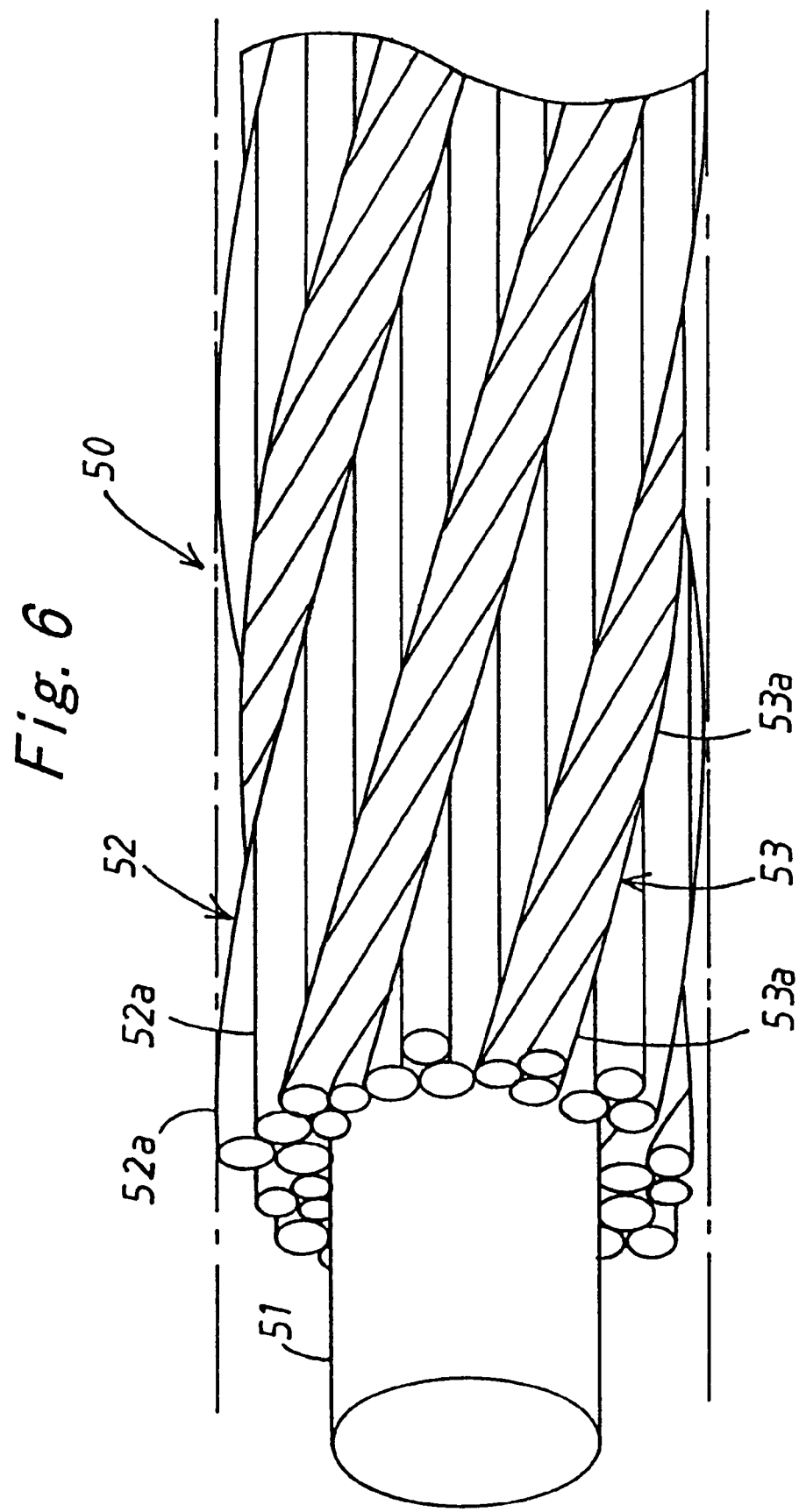

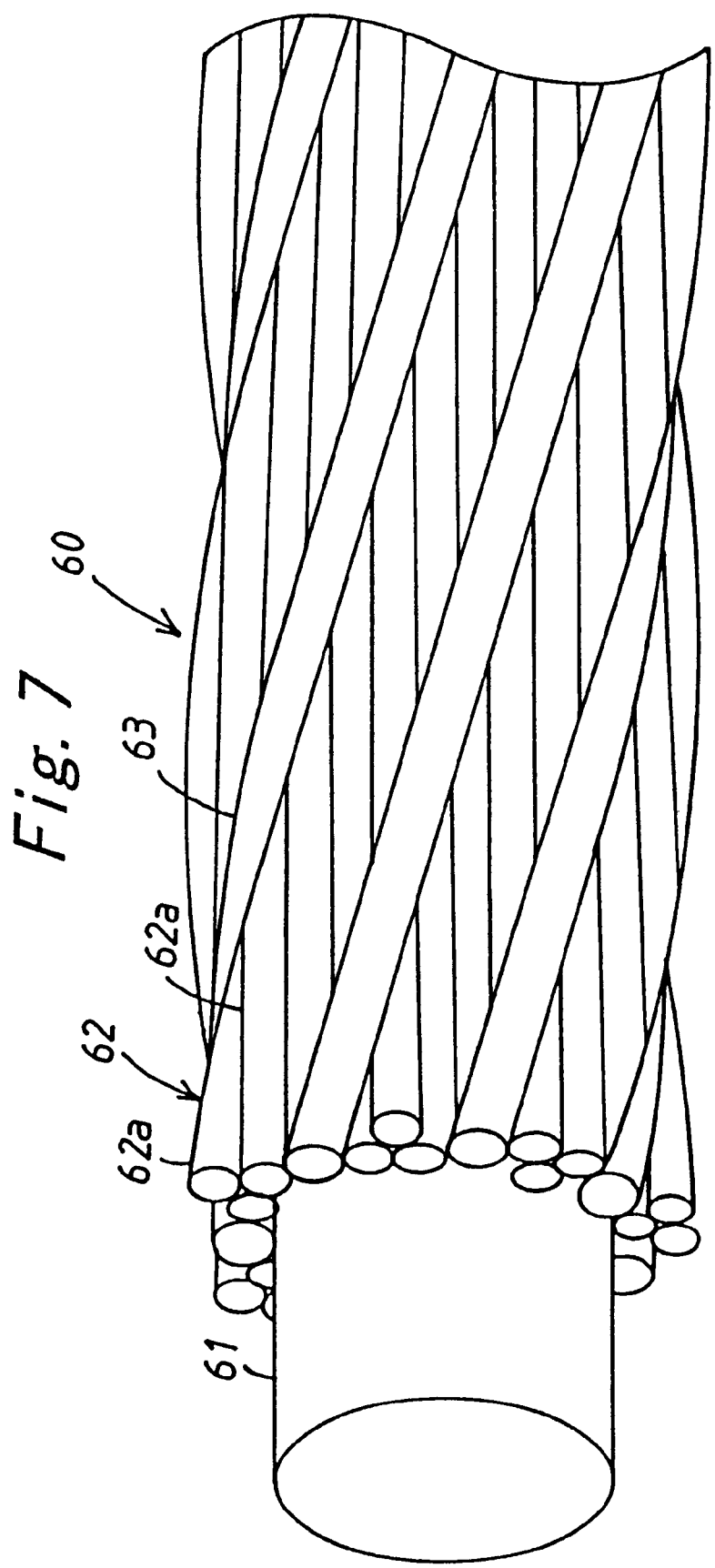

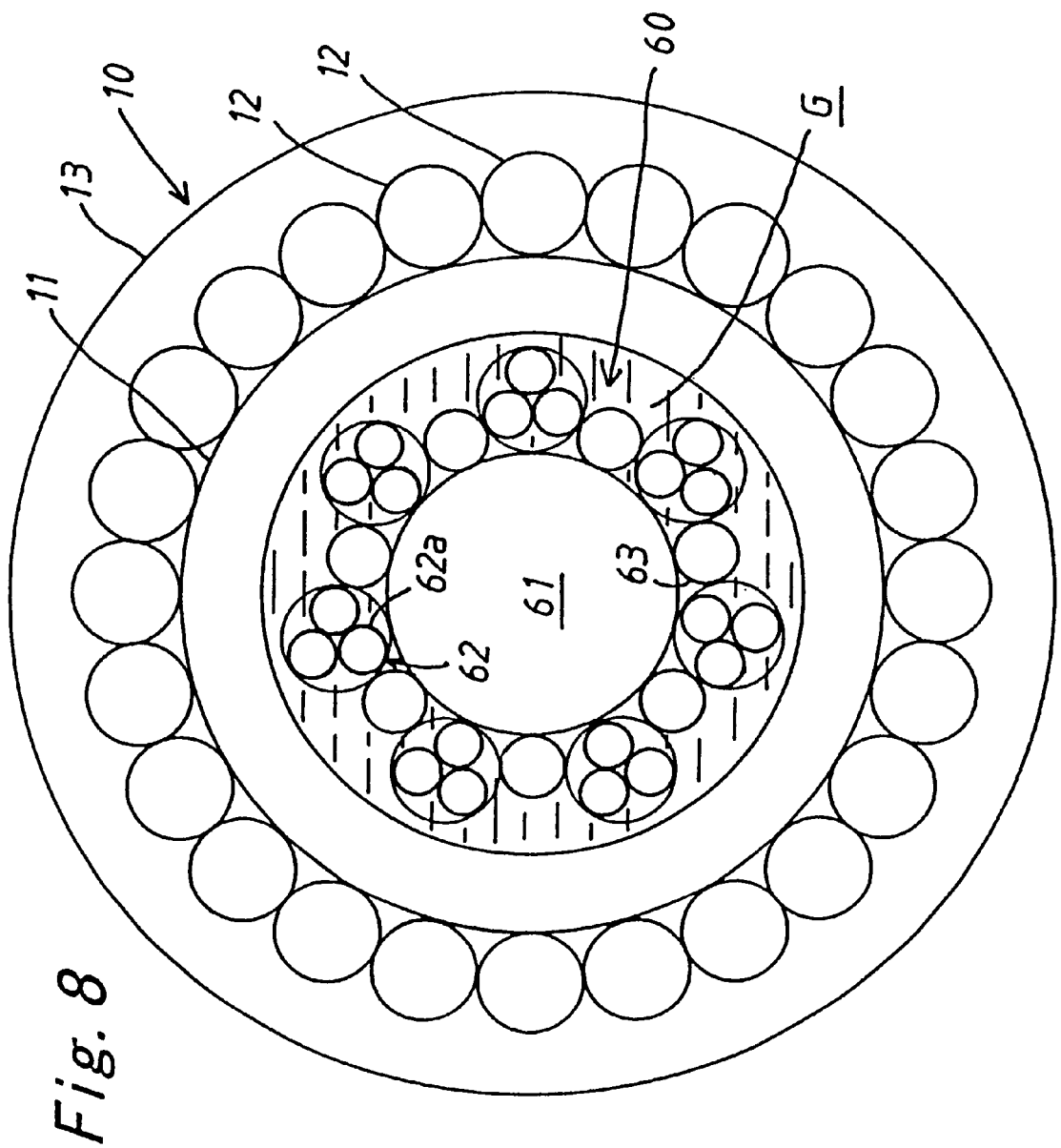

PUSH-PULL CONTROL CABLE

This application is a continuation application based on FIGS. 1 to 4 of the application Ser. No. 09/235,761 filed on Jan. 25, 1999 now U.S. Pat. No. 6,209,415 issued on Apr. 3, 2001.

BACKGROUND OF THE INVENTION

1. Field of the Invention

The present invention relates to a push-pull control cable for transmitting an operation effort in pushing and pulling directions.

2. Description of the Prior Art

In Japanese Patent Laid-open Publication No. 7(1995) 26646, there has been proposed a push-pull type control cable including an inner cable comprised of a plurality of strands each formed by more than five pieces of twisted element wires and wound around a core wire, the inner cable being inserted into a conduit tube to be displaced in an axial direction for transmitting an operation effort applied to its one end at a push-side or a pull-side. In use of the control cable, lubricant is filled in a clearance between the inner periphery of the conduit tube and the outer periphery of the inner cable to reduce friction of the inner cable in the conduit tube thereby to enhance load efficiency and durability of the control cable. In the conventional control cable, however, a sufficient amount of lubricant may not be filled in the clearance between the inner cable and the conduit tube. As a result, the enhanced load efficiency and durability of the control cable may not be maintained for a long period of time.

SUMMARY OF THE INVENTION

An object of the present invention is to provide a push-pull type control cable the load efficiency and durability of which are maintained in an enhanced condition for a long period of time.

According to the present invention, the object is accomplished by providing a push-pull type control cable having a conduit tube and an inner cable comprised of a core wire and a plurality of strands wound around the core wire and inserted into the conduit tube, the control cable being filled with lubricant at a clearance between an inner periphery of the conduit tube and an outer periphery of the inner cable, wherein the plurality of strands each are comprised of three pieces of element wires twisted in a manner of ordinary lay (twisted in a reverse direction relative to the winding direction of the strands. In the push-pull type control cable, a sufficient amount of lubricant is filled in a clearance between the outer periphery of the inner cable and the inner periphery of the conduit tube since rugged surfaces larger in roughness are formed on the strands of the inner cable. This is useful to maintain load efficiency and durability of the control cable in an enhanced condition for a long period of time. As the element wires each are relatively large in diameter to enhance each bending stiffness of the strands in a small diameter, the buckling strength of the inner cable can be increased to enhance operability of the control cable. As the outer peripheral area of the inner cable in contact with the inner periphery of the conduit tube is reduced, friction of the inner cable caused by displacement in the conduit tube can be decreased to enhance the load efficiency of the control cable. In addition, the three pieces of element wires of each strand are twisted in such a manner that each element wire is pressed into contact with other two element wires to maintain the configuration of each strand for a long period of time.

In actual practices of the present invention, it is desirable that the plurality of strands each are comprised of three pieces of element wires twisted in a manner of ordinary lay (twisted in a reverse direction relative to the winding direction of the strands around the core wire). In the strands of the inner cable, the element wires are stranded at a small angle relative to the axial direction of the inner cable to enhance the buckling strength of the inner cable. As the element wires appeared on the inner cable are aligned in parallel in the axial direction of the inner cable, the friction of the inner cable caused by displacement in the conduit tube is reduced to enhance the load efficiency and durability of the control cable.

In actual practices of the present invention, the plurality of strands may be provided in the form of a plurality of first strands each comprised of twisted element wires of large diameter twisted in a manner of ordinary lay (twisted in a reverse direction relative to the winding direction of the first strands and a plurality of second strands comprised of element wires of small diameter twisted in the same manner as in the first strands, wherein the first and second strands are alternately wound around the core wire. With such an arrangement, a sufficient amount of lubricant can be filled in a clearance between the second strands and the inner periphery of the conduit tube to maintain the load efficiency and durability of the control cable in an enhanced condition for a long period of time. In addition, the load efficiency of the control cable is further enhanced as the outer peripheral area of the inner cable in contact with the inner periphery of the conduit tube is reduced.

In actual practices of the present invention, the plurality of strands may be provided in the form of a plurality of first strands each comprised of three pieces of element wires twisted in a manner of ordinary lay and a plurality of second strands each comprised of three pieces of element wires twisted in a manner of langs lay (twisted in the same direction as the winding direction of the strands on the core wire), wherein the first and second strands are alternately wound around the core wire. With this arrangement, the operability, load efficiency and durability of the control cable can be enhanced, and the elasticity of the inner cable can be enhanced since the angle of the element wires relative to the axis line of the inner cable is increased.

In the above arrangement, the first strands each may be comprised of stranded element wires of large diameter, while the second strands each may be comprised of twisted element wires of small diameter. With this arrangement, a sufficient amount of lubricant can be filled to maintain the load efficiency and durability of the control cable in an enhanced condition for a long period of time. In this case, the friction caused by axial displacement of the inner cable in the conduit tube is reduced since only the first strands formed in the ordinary lay are in contact with the inner periphery of the conduit tube. This serves to enhance the elasticity of the control cable without causing deterioration of the load efficiency and durability.

Furthermore, the push-pull type control cable may be provided in the form of a control cable having an inner cable comprised of a strand formed by three pieces of twisted element wires and a single wire of small diameter alternately wound around a core wire and inserted into a conduit tube, the control cable filled with lubricant at a clearance between an inner periphery of the conduit tube and an outer periphery of the inner cable.

BRIEF DESCRIPTION OF THE DRAWINGS

FIG. 6 is a third modification of the inner cable shown in FIG. 1;

FIG. 7 is a fourth modification of the inner cable shown in FIG. 1; and

FIG. 8 is a cross-sectional view of the fourth modification.

DETAILED DESCRIPTION OF THE PREFERRED EMBODIMENTS

Figure 1:
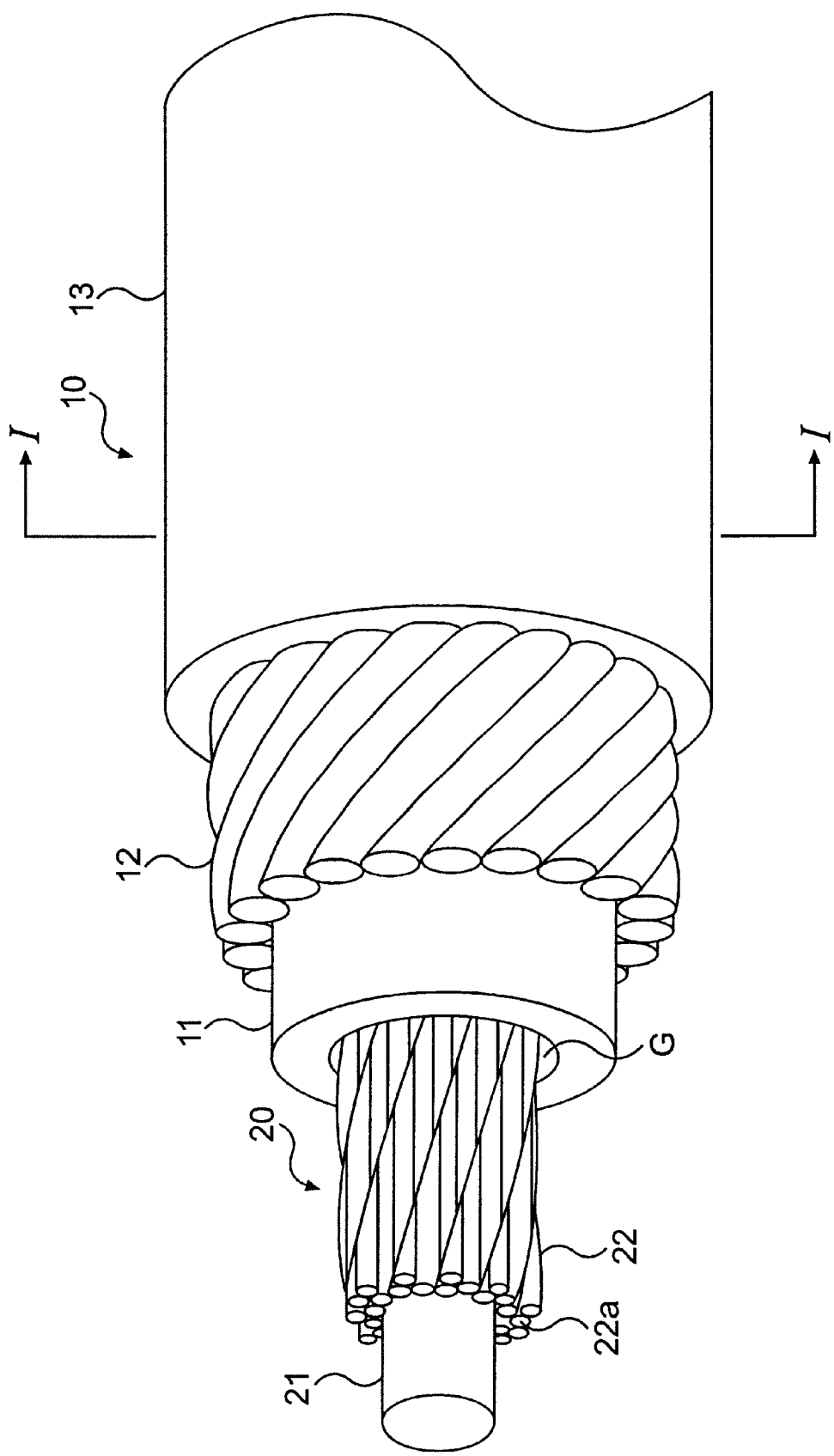
FIG. 1 is a view showing a component of a push-pull type control cable in a preferred embodiment of the present invention.
Figure 2:
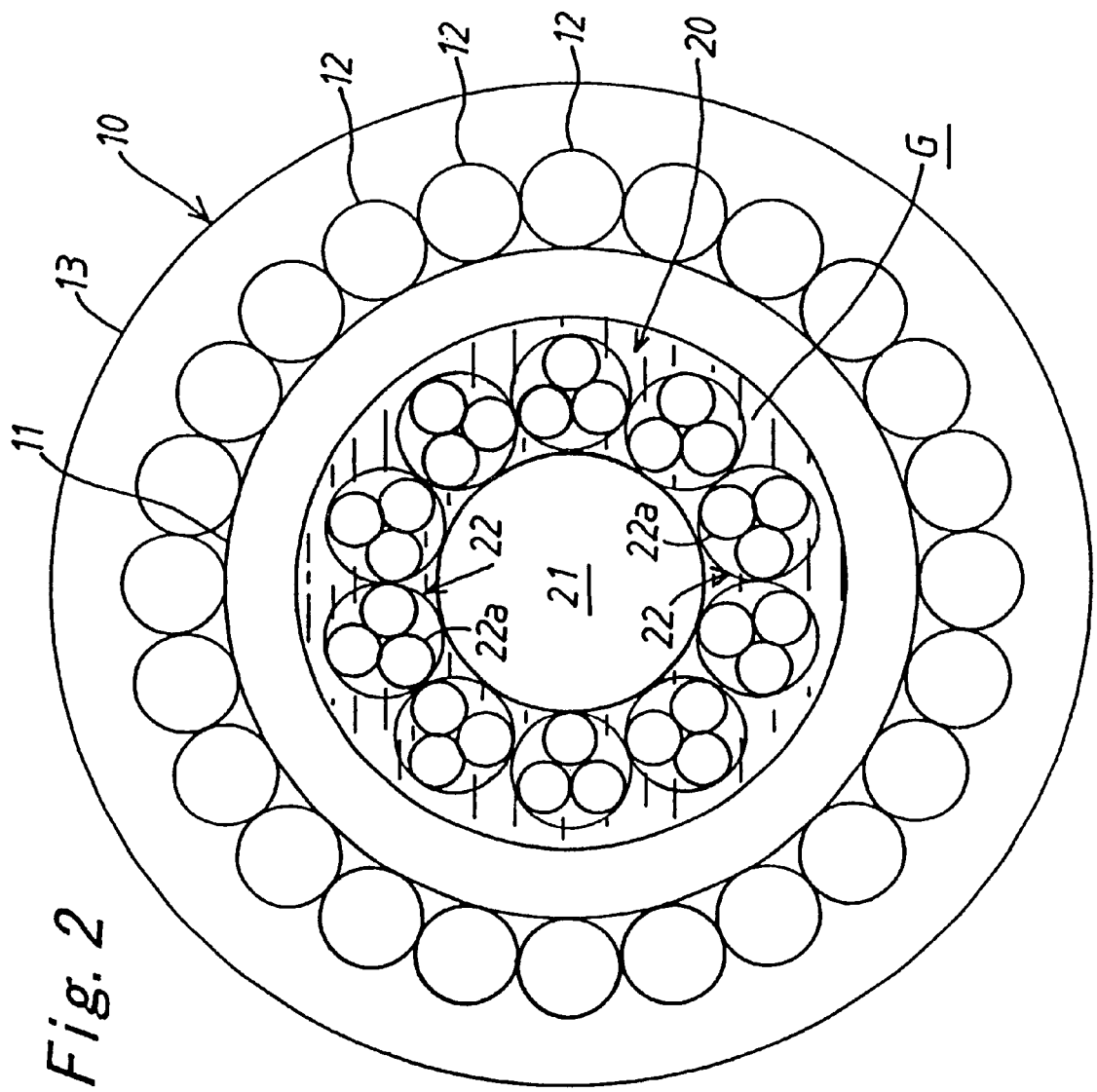
FIG. 2 is a cross-sectional view of the control cable of the invention taken on plane I—I of FIG. 1.

Hereinafter, a preferred embodiment of the present invention will be described with reference to the drawings. FIG. 1 illustrates a component of a push-pull control cable in the preferred embodiment, and FIG. 2 illustrates a cross-section of the control cable. The control cable is composed of a conduit tube 10 and an inner cable 20.

The conduit tube 10 is comprised of a liner 11 in the form of a hollow cable of synthetic resin, a plurality of strands 12 each formed by twisted element wires (for example, plated hard steel wires, stainless wires, etc.) and wound around the liner 11 and a jacket of synthetic resin covering the strands 12. The conduit tube 10 is flexible in its entirety.

The inner cable 20 is comprised of a core wire 21 and a plurality of strands (in this embodiment, ten pieces of strands) wound around the core wire 21. The inner cable 20 is flexible in its entirety and inserted into the liner 11 of conduit tube 10. The core wire 21 is made of a material superior in straightness (for example, a stainless wire, an oil-temper wire, a bluing wire, a heat-stretch wire, a piano wire, etc.). The strands 22 each are comprised of three pieces of element wires 22a (for example, plated hard steel wires, stainless wires, etc.) twisted in a manner of ordinary lay. As shown in FIG. 2, a clearance between the outer periphery of inner cable 20 and the inner periphery of liner 11 of conduit tube is filled with an amount of lubricant such as grease G.

In the push-pull type control cable, the inner cable in conduit tube is displaced by an operation effort applied at one end at a push-side or pull-side for transmitting the operation effort to the other end. In such an instance, each strand 12 of the conduit tube 10 acts to enhance bending stiffness of the conduit tube 10 for supporting displacement reaction of the inner cable 20, and the grease G serves to reduce friction of the inner cable 20 in the conduit tube 10. This is useful to enhance the load efficiency and durability of the control cable. In the control cable, it is to be noted that the strands 22 each are comprised of three pieces of element wires twisted to form rugged surfaces larger in roughness than those in a conventional push-pull type control cable. With such construction of the strands 20, a sufficient amount of grease G can be filled in the clearance between the inner cable 20 and the liner 11 of conduit tube 10. This is useful to maintain the enhanced load efficiency and durability of the control cable for a long period of time.

As the element wires 22a each are relatively large in diameter to enhance each bending stiffness of the strands 22 in a small diameter, the buckling strength of the inner cable 20 can be increased to reduce backlash of the control cable. As the outer peripheral area of the inner cable 20 in contact with the inner periphery of the conduit tube 10 is reduced, the friction of inner cable 20 caused by displacement in the conduit tube 10 can be decreased to enhance the load efficiency of the control cable. In addition, the three pieces of element wires 22a of the respective strands 22 are twisted in such a manner that each element wire is pressed into contact with other two element wires to maintain the configuration of each strand 22 for a long period of time.

In each of the strands 22, the element wires 22a are twisted in a manner of ordinary lay at a small angle relative to the axial direction of the inner cable 20 to enhance the bucking strength of the inner cable 20. As the element wires 22a exposed on the inner cable 20 are aligned in parallel in the axial direction of inner cable 20, the friction of inner cable 20 caused by displacement in the conduit tube 10 is reduced to enhance the load efficiency and durability of the control cable.

Hereinafter, first to fourth modifications of the above embodiment will be described with reference to the drawings.

Figure 3A:
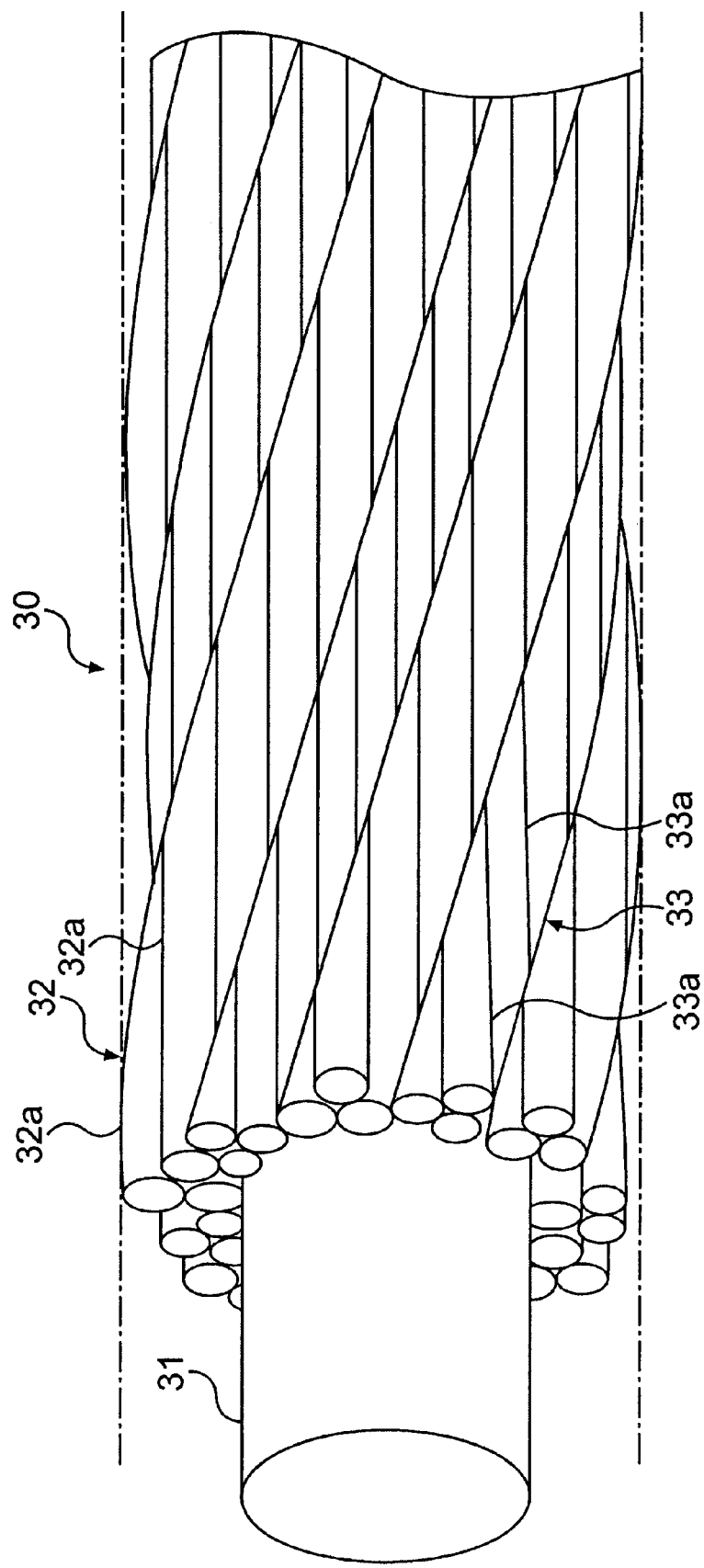
FIG. 3(a) is a perspective view of a first modification of the inner cable shown in FIG. 1.
Figure 3B:
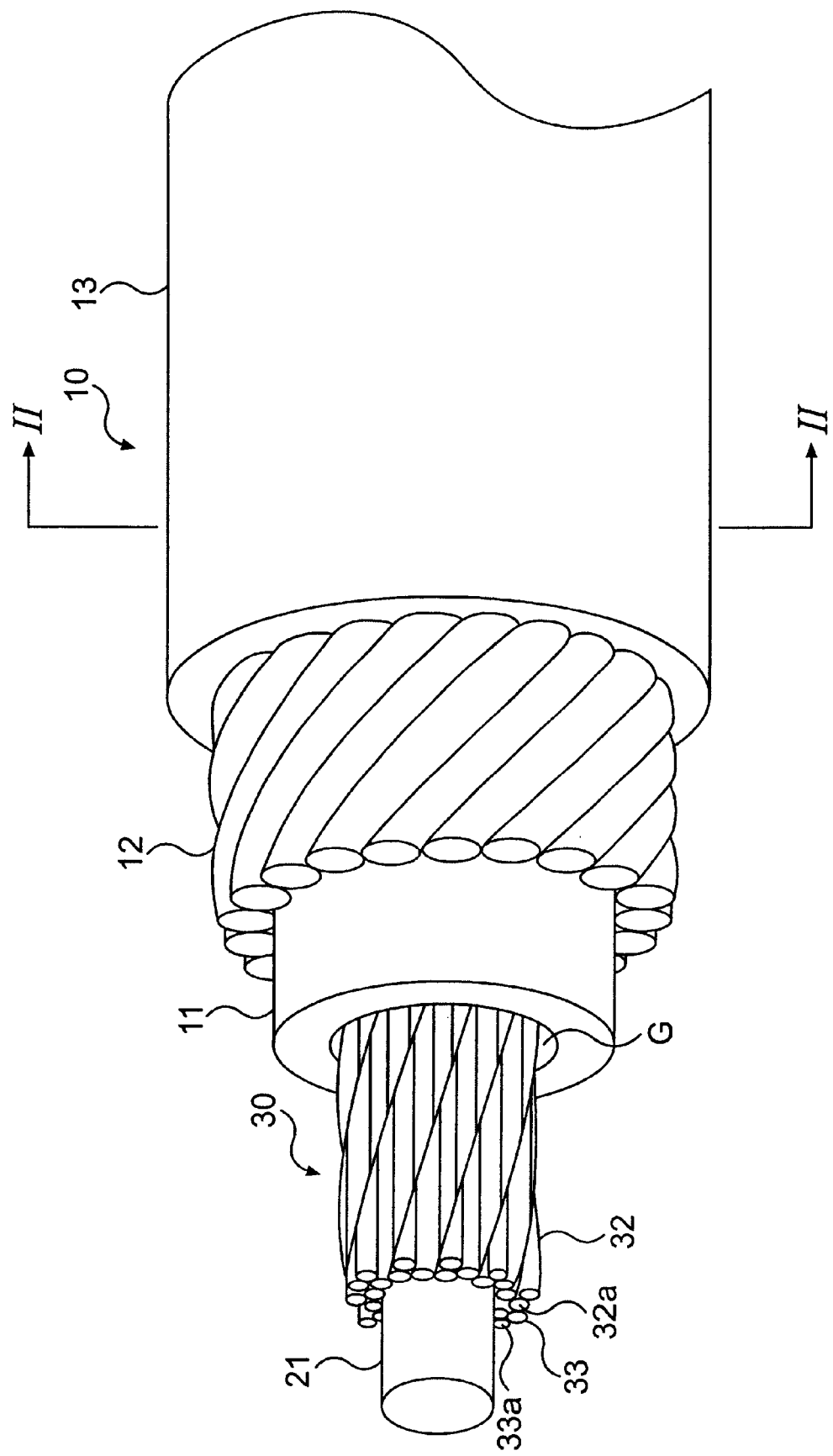
FIG. 3(b) is a cross-sectional view of the control cable with the first modification shown in FIG. 3(a)
Figure 4:
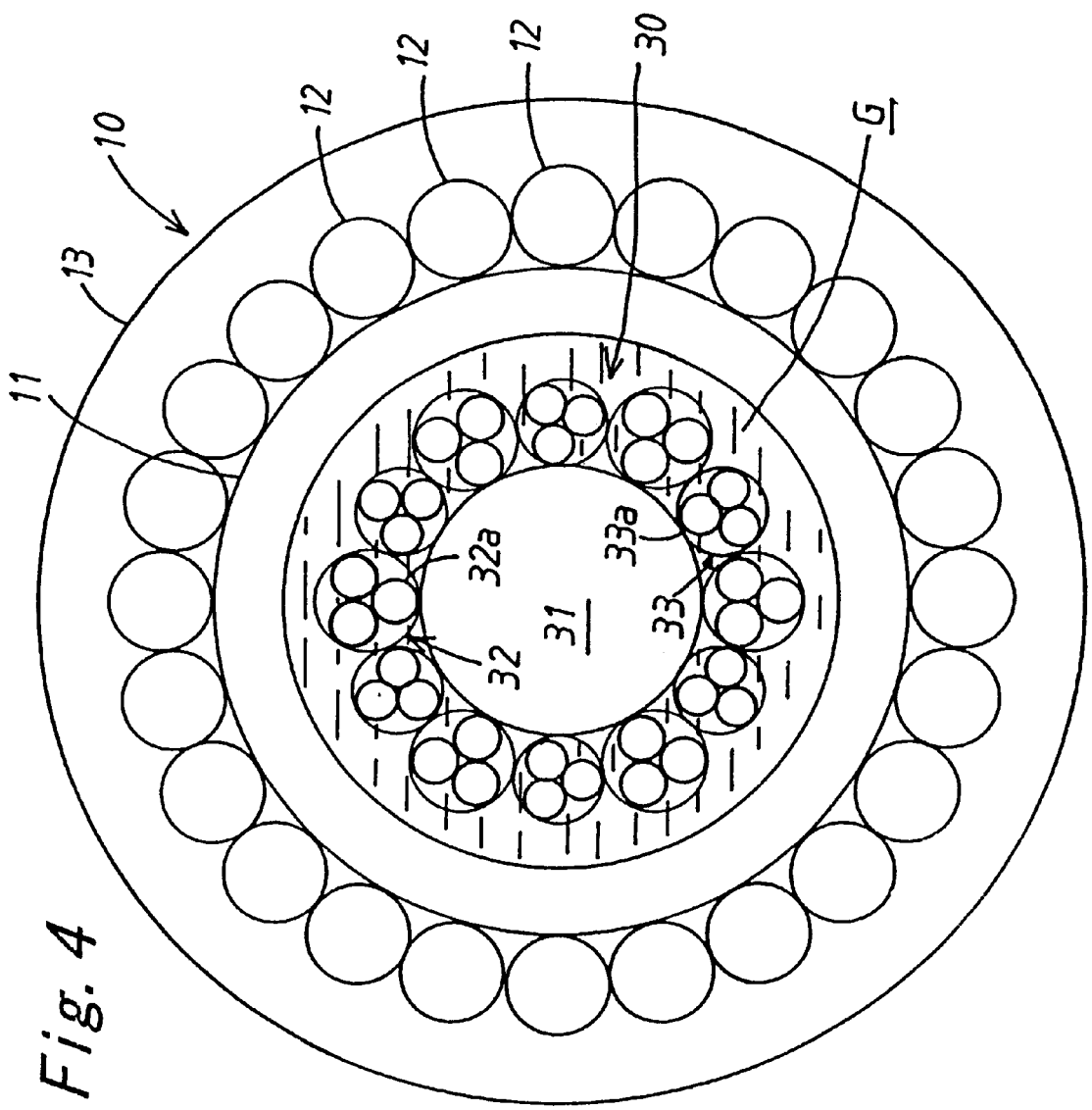
FIG. 4 is a cross-sectional view of the first modification of the invention taken on plane II—II of FIG. 3(b)

First modification:

Illustrated in FIG. 3 is a first modification of the control cable wherein an inner cable 30 is substituted for the inner cable 20 in the preferred embodiment. FIG. 4 illustrates a cross-section of the control cable in the first modification. The inner cable 30 is comprised of a core wire 31 of material superior in straightness similar to the core wire 21 of the inner cable 20 and a plurality of first and second strands 32 and 33 alternately wound around the outer periphery of core wire 31. The inner cable 30 is flexible in its entirety and inserted into the liner 11 of conduit tube 10. Similarly to the strands 22 of the inner cable 20, the first strands 32 each are comprised of three pieces of element wires 32 (for example, plated hard steel wires, stainless wires, etc.) twisted in a manner of ordinary lay, while the second strands 33 each are comprised of three pieces of element wires 33a twisted in a manner of ordinary lay. The element wires 33a each are made of the same material as the element wires 32a and formed smaller in diameter than the element wire 32a to provide the second strands 33 each slightly smaller in diameter than the first strands 32.

In the push-pull type control cable described above, the same effects to those in the preferred embodiment can be expected since the first and second strands 32 and 33 each are comprised of three pieces of element wires 32a, 33a respectively twisted in a manner of ordinary lay. As the second strands 33 in the control cable each are formed smaller in diameter than the first strands 32, a sufficient amount of grease G can be filled in a clearance between the second strands 33 and the liner 11 of conduit tube 10 to maintain the load efficiency and durability of the control cable in an enhanced condition for a long period of time. As the outer peripheral area of inner cable 30 in contact with the inner periphery of conduit tube 10 is smaller than the outer peripheral area of inner cable 20 in contact with the inner periphery of conduit tube 10, the load efficiency of the control cable is further enhanced.

Figure 5A:
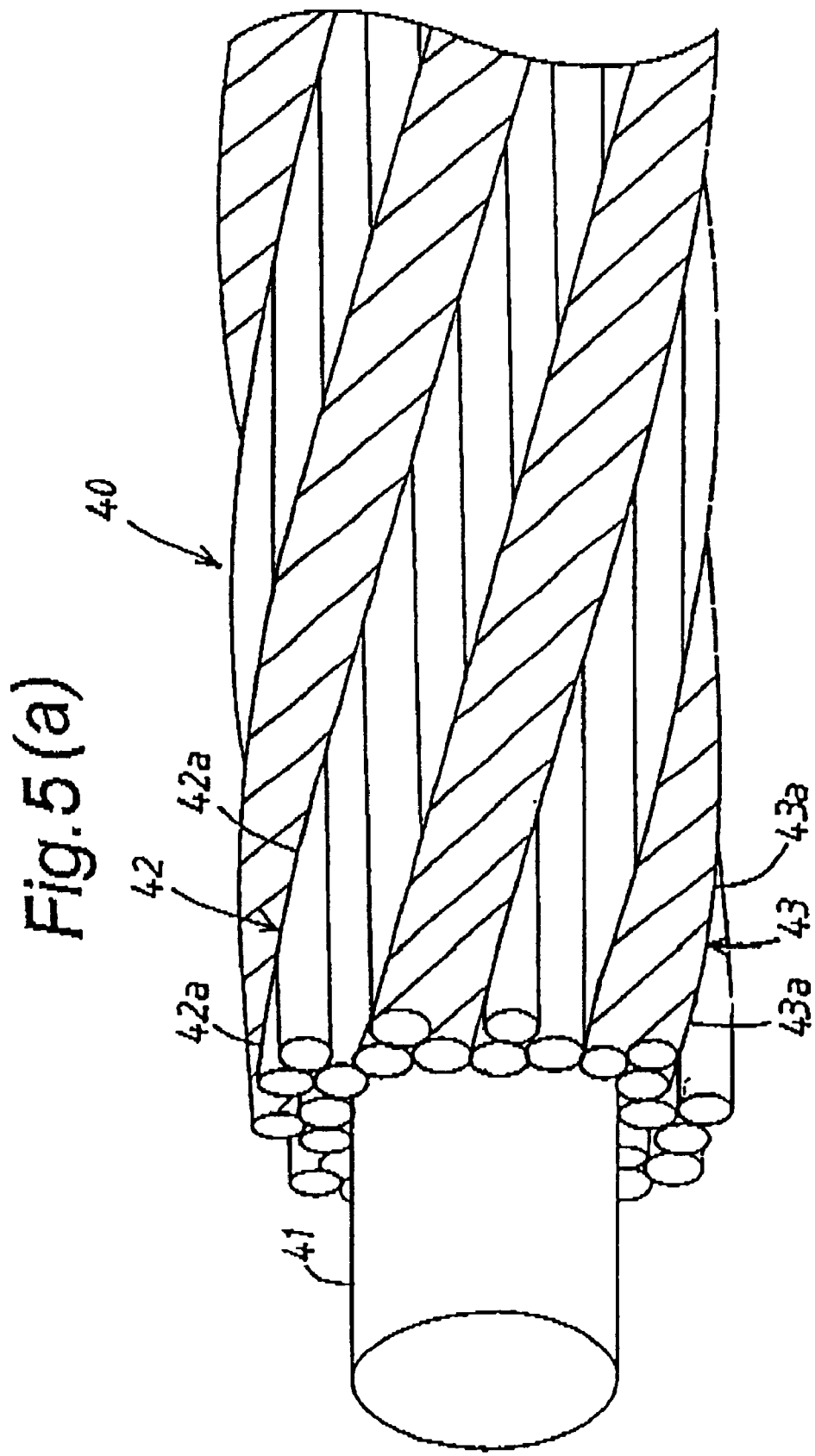
FIG. 5(a) is a second modification of the inner cable shown in FIG. 1.
Figure 5:
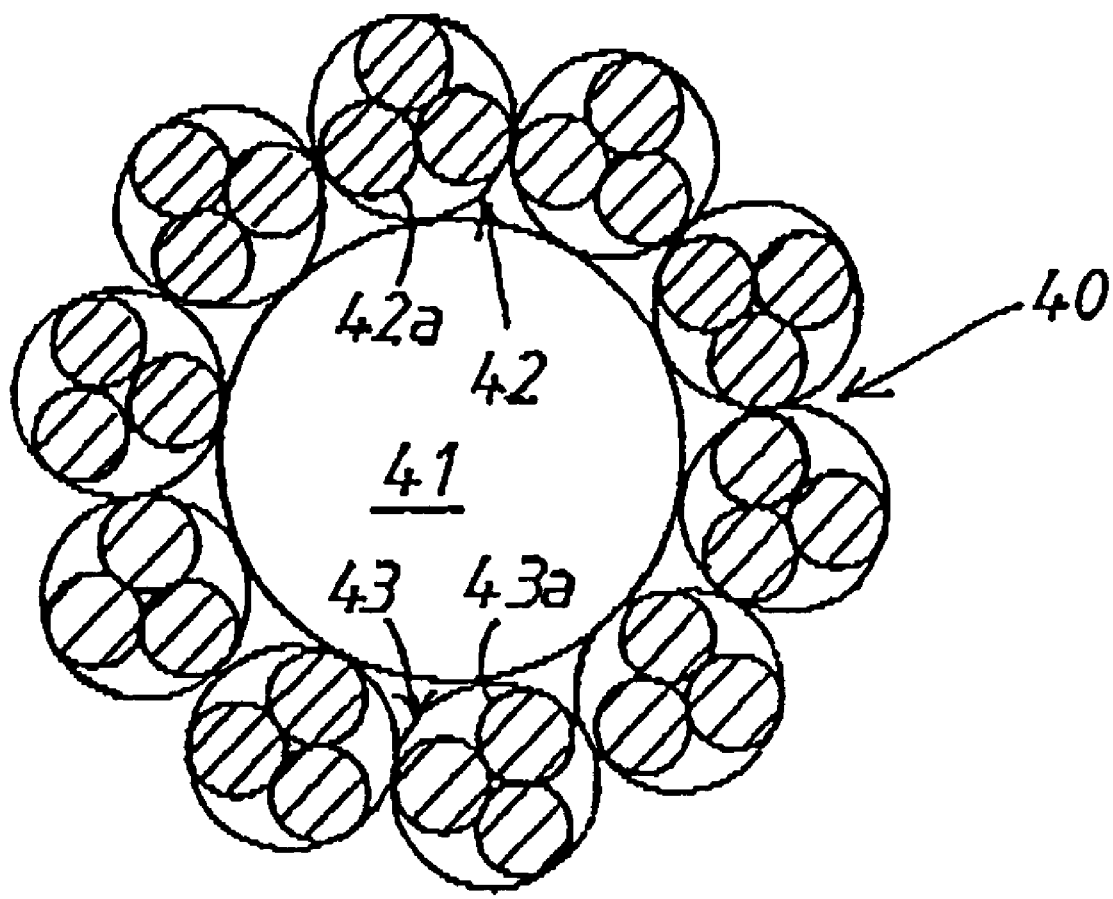
FIG. 5(b) is a cross sectional view of a control cable shown in FIG. 5(a)

Second modification:

Illustrated in FIG. 5 is a second modification of the control cable wherein an inner cable 40 is substituted for the inner cable 20 in the preferred embodiment. The inner cable 40 is comprised of a core wire 41 of the same material superior in straightness as that of the core wire 21 in the inner cable 20 and a plurality of first and second strands 42 and 43 (for example, five pieces of strands) alternately wound around the core wire 41. The inner cable 40 is flexible in its entirety and inserted into the conduit tube 10. The first strands 42 each are comprised of three pieces of element wires 42a (for example, plated hard steel wires, stainless wires, etc.) twisted in a manner of ordinary lay as well as the strands 22 of the inner cable 20, while the second strands 43 each are comprised of three pieces of element wires 43a twisted in a manner of langs lay.

In the push-pull type control cable described above, the same effects as those in the preferred embodiment can be expected since the first and second strands 42 and 43 each are comprised of three pieces of element wires 42a, 43a and the first strands 42 are formed in the ordinary lay. As the second strands 43 in the control cable each are formed in the langs lay so that the angle of the element wires 43a relative to the axis line of inner cable 40 is increased, the elasticity of inner cable 40 can be enhanced.

Third modification:

Illustrated in FIG. 6 is a third modification of the control cable wherein an inner cable 50 is substituted for the inner cable 20 in the preferred embodiment. In this modification, the inner cable 50 is comprised of a core wire 51 of the same material superior in straightness as that of the core wire 21 of inner cable 20 and a plurality of first and second strands 52 and 53 (for example, six pieces of strands) alternately wound around the core wire 51. The inner cable 50 is flexible in its entirety and inserted into the conduit tube 10. The first strands 52 each are comprised of three pieces of element wires (for example, plated hard steel wires, stainless wires, etc.) 52a twisted in a manner of ordinary lay as well as the strands 22 of inner cable 20, while the second strands 53 each are comprised of three pieces of element wires 53a twisted in a manner of langs lay. The element wires 53a are made of the same material as that of the element wires 52a and formed smaller in diameter than the element wires 52a to provide the second strands 53 slightly smaller in diameter than the first strands 52.

In the push-pull type control cable described above, the same effects as those in the preferred embodiment can be expected since the first and second strands 52 and 53 in the control cable each are comprised of three pieces of element wires 52a, 53a and the first strands 52 are formed in the manner of ordinary lay, and the same effects as those in the first modification can be expected since the second strands 53 each are formed smaller in diameter. In addition, the elasticity of the control cable can be enhanced as in the second modification since the second strands 53 each are formed in the langs lay. In this modification, the friction caused by axial displacement of the inner cable 50 in the conduit tube 10 is reduced less than that in the second modification since only the first strands 52 formed in the ordinary lay are in contact with the inner periphery of liner 11 of conduit tube 10. This serves to enhance the load efficiency and durability of the control cable.

Fourth modification:

Illustrated in FIG. 7 is a fourth modification of the control cable wherein an inner cable 60 is substituted for the inner cable 20 in the preferred embodiment. FIG. 8 illustrates a cross-section of the control cable in this modification. The inner cable 60 is comprised of a core wire 61 of the same material superior in straightness as the core wire 21 of inner cable 20, a plurality of strands 62 and a single wire 63 is alternately wound around the core wire 61. The inner cable 60 is flexible in its entirety and inserted into the liner 11 of conduit tube 10. The strands 62 each are comprised of three pieces of element wires (for example, plated hard steel wires, stainless wires, etc.) twisted in a manner of ordinary lay as well as in the strands 22 of inner cable 20, while the single wire 63 is made of the same material as that of the element wire 62a and is formed slightly smaller in diameter than each of the strands 62.

In the push-pull type control cable described above, the same effects of those in the preferred embodiment can be expected since the strands 62 each are comprised of three pieces of element wires 62a twisted in the ordinary lay, and the same effects as those in the first modification can be expected since the single wire 63 is formed smaller in diameter than each of the strands 62.

Although in the fourth modification, the strands 62 each have been formed in the ordinary lay to enhance mainly the operability, durability and load efficiency of the control cable, a portion or the entirety of the strands 62 may be formed in the langs lay to enhance the elasticity of the control cable.

What is claimed is:

1. A push-pull type control cable having a conduit tube and an inner cable comprised of a core wire and a plurality of strands wound around the core wire and inserted into the conduit tube, the control cable being filled with lubricant in a clearance between an inner periphery of the conduit tube and an outer periphery of the inner cable, wherein the plurality of strands are provided in the form of a first plurality of first strands and a second plurality of second strands each comprised of three pieces of element wires twisted in a manner of ordinary lay or in the reverse direction relative to the winding direction of the strands, the first and second strands being alternately wound around the core wire, and the element wires of the second strands each are formed smaller in diameter than the element wires of the first strands such that the second strands are each smaller in diameter than the first strands.

2. A push-pull type control cable as claimed in claim 1, wherein the three pieces of element wires of each strand are twisted in such a manner that each element wire is pressed into contact with other two element wires and that the element wires exposed on the inner cable are aligned in parallel in the axial direction of the inner cable.

3. A push-pull type control cable as claimed in claim 1, wherein the core wire is made of at least one of a stainless wire, an oil-temper wire, a bluing wire, a heat-stretch wire and a piano wire.

4. A push-pull type control cable as claimed in claim 1, wherein each element wire of the first and second strands is made of at least one of a plated hard steel wire and a stainless steel wire.

* * * * *